(12) United States Patent  
Goto (10) Patent No.: US 8,691,437 B2  
(45) Date of Patent: Apr. 8, 2014

(54) METHOD FOR EVALUATING POSITIVE ELECTRODE ACTIVE MATERIAL

(75) Inventor: Satoshi Goto, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 101 days.

(21) Appl. No.: 13/391,630

(22) PCT Filed: Aug. 27, 2009

(86) PCT No.: PCT/JP2009/065004  
§ 371 (c)(1),  
(2), (4) Date: Feb. 22, 2012

(87) PCT Pub. No.: WO2011/024283  
PCT Pub. Date: Mar. 3, 2011

(65) Prior Publication Data  
US 2012/0148916 A1    Jun. 14, 2012

(51) Int. Cl.  
*H01M 4/02* (2006.01)  
*H01M 4/13* (2010.01)

(52) U.S. Cl.  
USPC ............................................. 429/211; 429/209

(58) Field of Classification Search  
None  
See application file for complete search history.

(56) References Cited

U.S. PATENT DOCUMENTS

| 7,544,443 | B2 | 6/2009 | Fujihara et al. | |
| 2008/0280205 | A1* | 11/2008 | Jiang et al. | 429/223 |
| 2010/0062337 | A1 | 3/2010 | Sun | |
| 2011/0059363 | A1* | 3/2011 | Imanari et al. | 429/224 |

FOREIGN PATENT DOCUMENTS

| JP | 2000-173622 | 6/2000 |
| JP | 2001-335323 | 12/2001 |
| JP | 2007-273448 | 10/2007 |
| JP | 2008-10234 | 1/2008 |
| JP | 2008-529253 | 7/2008 |
| JP | 2009-32655 | 2/2009 |

OTHER PUBLICATIONS

Kwon et al., The effect of lithium insertion-extraction on the local structure of lithium manganese oxides using X-Ray absorption spectroscopy, Journal of Power Sources 81-82 (1999) 510-516).*  
Strobel et al., New nanocrystalline manganese oxides as cathode materials for lithium batteries: Electron Microscopy, electrochemical and X-ray absorption studies (Solid State Ionics 177 (2006) 523-533).*

(Continued)

*Primary Examiner* — Patrick Ryan  
*Assistant Examiner* — Jose Colucci Rios  
(74) *Attorney, Agent, or Firm* — Finnegan, Henderson, Farabow, Garrett & Dunner, LLP (57) ABSTRACT

Provided is a method for evaluating a positive electrode active material. The method evaluates the performance of a positive electrode active material comprising a lithium transition metal oxide that contains a manganese-containing transition metal oxide. In this method, the lithium penetration rate into a transition metal site in the lithium transition metal oxide is evaluated based on the intensity ratio P between a first-neighbor Mn—O peak intensity A and a second-neighbor Mn-M peak intensity B in a radial distribution function obtained from EXAFS at the K absorption edge of manganese (Mn). Moreover, the ratio of excess lithium present in the positive electrode active material may also be evaluated based on the excess amount of added lithium Q contained in excess of the stoichiometric ratio of the lithium transition metal oxide and the intensity ratio P.

5 Claims, 3 Drawing Sheets

(56) References Cited

OTHER PUBLICATIONS

Translation of the International Preliminary Report on Patentability for PCT/JP2009/065004 dated Mar. 29, 2012.
International Search Report in International Application No. PCT/JP2009/065004; Mailing Date: Nov. 10, 2009.
Nakai et al., Development of a new in situ cell for the X-ray Absorption Fine Structure analysis of the electrochemical reaction in a rechargeable battery and its application to the Lithium Battery Material, $Li_{1+y}Mn_{2-y}O_4$★, Spectrochimica Acta Part B, vol. 54, (1999). pp. 143-149.

* cited by examiner

METHOD FOR EVALUATING POSITIVE ELECTRODE ACTIVE MATERIAL

TECHNICAL FIELD

The present invention relates to a method for evaluating a positive electrode active material.

BACKGROUND ART

Lithium-ion secondary batteries possess an electrode assembly wherein a separator is interposed between the positive electrode and the negative electrode. These lithium-ion secondary batteries can be charged and discharged by the movement of lithium ions between the positive electrode and negative electrode. A positive electrode active material that can reversibly achieve absorption and release of lithium ions is used in the positive electrode of this type of lithium-ion secondary battery. This positive electrode active material is composed primarily of an oxide containing lithium and a transition metal (lithium transition metal oxide). Using a solid solution formed by melting together a plurality of types of transition metal elements as a positive electrode active material has also been studied (for example, Patent Document 1 and Patent Document 2).

CITATION LIST

Patent Literature

Patent Document 1: JP 2007-273448 A
Patent Document 2: JP 2008-10234 A

SUMMARY OF INVENTION

Technical Problem

The lithium transition metal compound that comprises the primary ingredient of the positive electrode active material is synthesized, for example, by mixing together finely powdered starting materials containing the plurality of types of metallic elements constituting the compound in a suitable composition ratio and calcining the powder mixture. The lithium transition metal oxide has predetermined sites for the lithium to be positioned within the crystalline structure of the transition metal oxide.

Furthermore, in the lithium transition metal oxide a phenomenon known as cation mixing may occur wherein another metal (for example, nickel) contaminates a site where lithium should be present. When cation mixing occurs, rate characteristics and cycling characteristics decline because of a reduction in the number of lithium sites.

To counter this problem the inventors have investigated minimizing the effects of cation mixing by including excess lithium in the starting materials during manufacture of the positive electrode active material. For instance, a surplus of lithium in the positive electrode can be achieved by including excess lithium in the starting materials during manufacture of the positive electrode active material.

If a surplus of lithium is present in the positive electrode, lithium ions can be expected to move back and forth smoothly between the positive electrode and negative electrode during charge and discharge of the battery. As expected by the inventors, however, there are no improvements to the rate characteristics and cycling characteristics of lithium-ion secondary batteries even when the starting materials contain excess lithium during manufacture of the positive electrode active material.

The performance of the positive electrode active material is affected not only by the composition ratio of the starting materials, but also by the conditions during calcination of the mixed starting materials, etc. Therefore, the inventors considered evaluating the performance of the positive electrode active material used in lithium-ion secondary batteries and selectively using a positive electrode active material with better performance.

By assembling test batteries to a fixed standard, for example, the performance of the positive electrode active material can be evaluated based on the performance of those test batteries. However, a method for evaluating the performance of a positive electrode active material from the indicators that can be obtained by analyzing the positive electrode active material itself has not been established. If the performance of the positive electrode active material could be evaluated from the indicators that can be obtained by analyzing the positive electrode active material itself, evaluation of the positive electrode active material would become more simple, and it would also contribute to the establishment of technology for efficient production of positive electrode active materials with good performance.

In regard to the positive electrode active material, the present invention provides suitable indicators for evaluating the performance of a positive electrode active material.

Solution to Problem

The method for evaluating a positive electrode active material evaluates the performance of a positive electrode active material containing lithium transition metal oxides including manganese-containing transition metal oxides. In this method the lithium penetration rate into transition metal sites in the lithium transition metal oxide is evaluated based on the intensity ratio P between a first-neighbor Mn—O peak intensity A and a second-neighbor Mn-M peak intensity B in a radial distribution function obtained from EXAFS at the K absorption edge in manganese (Mn).

In other words, a given number of oxygen atoms neighboring the manganese atoms are present in the manganese-containing lithium transition metal oxide. Furthermore, a given number of transition metal sites are present on the outside of the oxygen atoms. In the radial distribution function obtained from EXAFS at the K absorption edge of manganese of the lithium transition metal oxide, the first-neighbor Mn—O peak intensity A remains largely unchanged. In contrast, the second-neighbor Mn-M peak intensity B decreases when lithium penetrates the transition metal sites. As a result, the lithium penetration rate into the transition metal sites in the lithium transition metal oxide can be evaluated based on the intensity ratio P between the abovementioned first-neighbor Mn—O peak intensity A and the second-neighbor Mn-M peak intensity B. Here, the term "transition metal sites" refers to sites in which transition metal elements should fundamentally be present in the structure of the composition.

Alternatively, when excess lithium is present in a larger amount than the stoichiometric ratio of the lithium transition metal oxide in the positive electrode active material, the ratio of excess lithium present in the positive electrode active material may be evaluated based on the abovementioned intensity ratio P and the excess amount of added lithium Q that is present in excess of the stoichiometric ratio of the lithium transition metal oxide.

Moreover, in lithium-ion secondary batteries, there are cases in which the positive electrode current collector of the positive electrode is equipped with a positive electrode active material composed primarily of a manganese-containing lithium transition metal oxide. In this case, lithium is present in excess of the stoichiometric ratio of the lithium transition metal oxide, and the following conditions (A) and (B) can be satisfied.

Condition (A): P=B/A and P≥1.2, where P is the intensity ratio between the first-neighbor Mn—O peak intensity A and the second-neighbor Mn-M peak intensity B in the radial distribution function obtained from EXAFS at the K absorption edge in Mn.

Condition (B): Q≥0.05, where Q is the amount of added lithium that is present in excess of the stoichiometric ratio of the abovementioned lithium transition metal oxide.

Furthermore, in a different mode, lithium is present in a lithium-ion secondary battery in excess of the stoichiometric ratio of the lithium transition metal oxide, and a positive electrode active material that satisfies the following condition (C) can be used.

Condition (C): P=B/A and P≥−1.33Q+1.43, where P is the intensity ratio between the first-neighbor Mn—O peak intensity A and the second-neighbor Mn-M peak intensity B in the radial distribution function obtained from EXAFS at the K absorption edge in Mn, and Q is the amount of added lithium that is present in excess of the stoichiometric ratio of the lithium transition metal oxide.

DESCRIPTION OF EMBODIMENTS

The method for evaluating the positive electrode active material in one example of the present invention is described below.

The manganese-containing lithium transition metal oxide is represented by $Li_{x+\alpha}[Mn_{y1}M_{y2}]O_z$. Here, M indicates at least one variety of transition metal element (for example, Ni, Co, Al, Ti, Fe, Cu, Zn, Ga, etc.) not including Li or Mn; x, y1, y2, and z are natural numbers that denote the stoichiometric ratios that hold for the lithium, transition metals, and oxygen (note that y2 may include 0); and α denotes the amount of lithium that is contained in excess of the stoichiometric ratio.

In the lithium transition metal oxide used for the positive electrode active material of lithium-ion secondary batteries, it is desirable that the amount of lithium that contributes substantially to the charge and discharge of the lithium-ion secondary battery be large. However, the battery characteristics of lithium-ion secondary batteries may not substantially improve even if excess lithium is contained in a positive electrode active material comprising a lithium transition metal oxide formed from a manganese-containing transition metal oxide. The inventors performed an incisive investigation of the finding that battery properties of lithium-ion secondary batteries do not substantially improve even if excess lithium is contained therein, and arrived at the following understanding.

The manganese-containing lithium transition metal oxide primarily has a spinel-type crystalline structure. In this crystalline structure a given number of oxygen atoms surround the manganese atoms. Furthermore, a given number of transition metal sites are present outside the oxygen atoms. Depending upon the calcination conditions, in a positive electrode active material comprising a manganese-containing lithium transition metal oxide as its primary component the lithium can sometimes enter the transition metal sites. Even when excess lithium is included when the starting materials are formulated, the amount of excess lithium present in the positive electrode active material does not increase appreciably if a large amount of lithium enters the transition metal sites. As a result, the desired effect of including excess lithium cannot be adequately realized.

Based on the abovementioned considerations, the present invention proposes a new method for evaluating a positive electrode active material that comprises primarily a manganese-containing lithium transition metal oxide.

<<Intensity Ratio P>>

According to the abovementioned considerations, in the positive electrode active material comprising primarily a manganese-containing lithium transition metal oxide, it is desirable that the lithium penetration rate into the transition metal sites of the lithium transition metal oxide be small. The first indicator proposed in the present invention is the intensity ratio P between the first-neighbor Mn—O peak intensity A and the second-neighbor Mn-M peak intensity B in the radial distribution function obtained from EXAFS at the K absorption edge in manganese. The lithium penetration rate into the transition metal sites of the manganese-containing lithium transition metal oxide can be evaluated from this intensity ratio P. The intensity ratio P is explained below.

Figure 1:
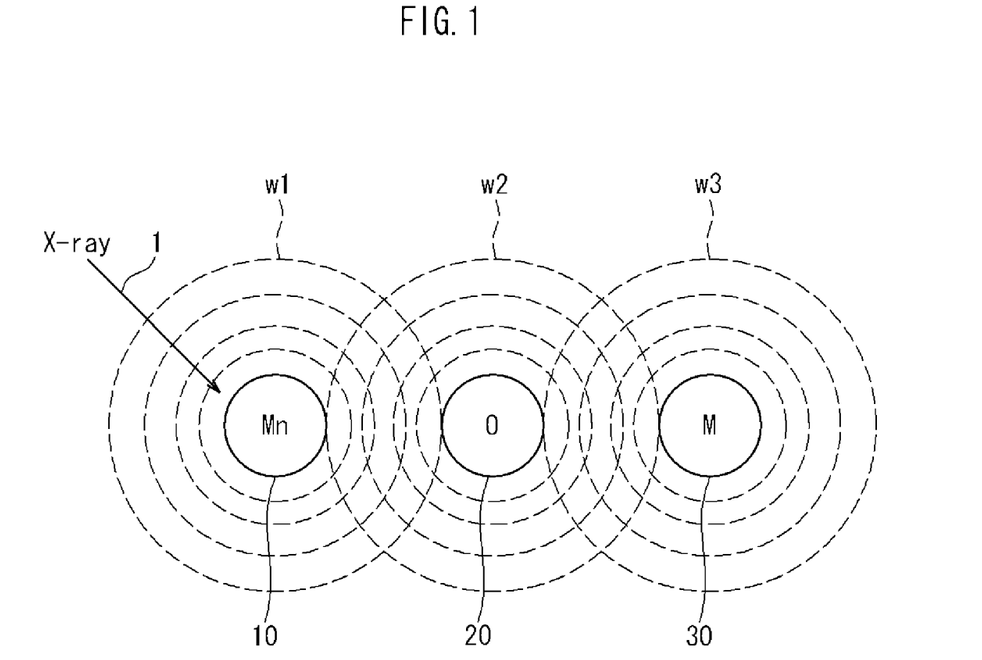
FIG. 1 is a drawing that schematically shows EXAFS for the manganese-containing lithium transition metal oxide.
Figure 2:
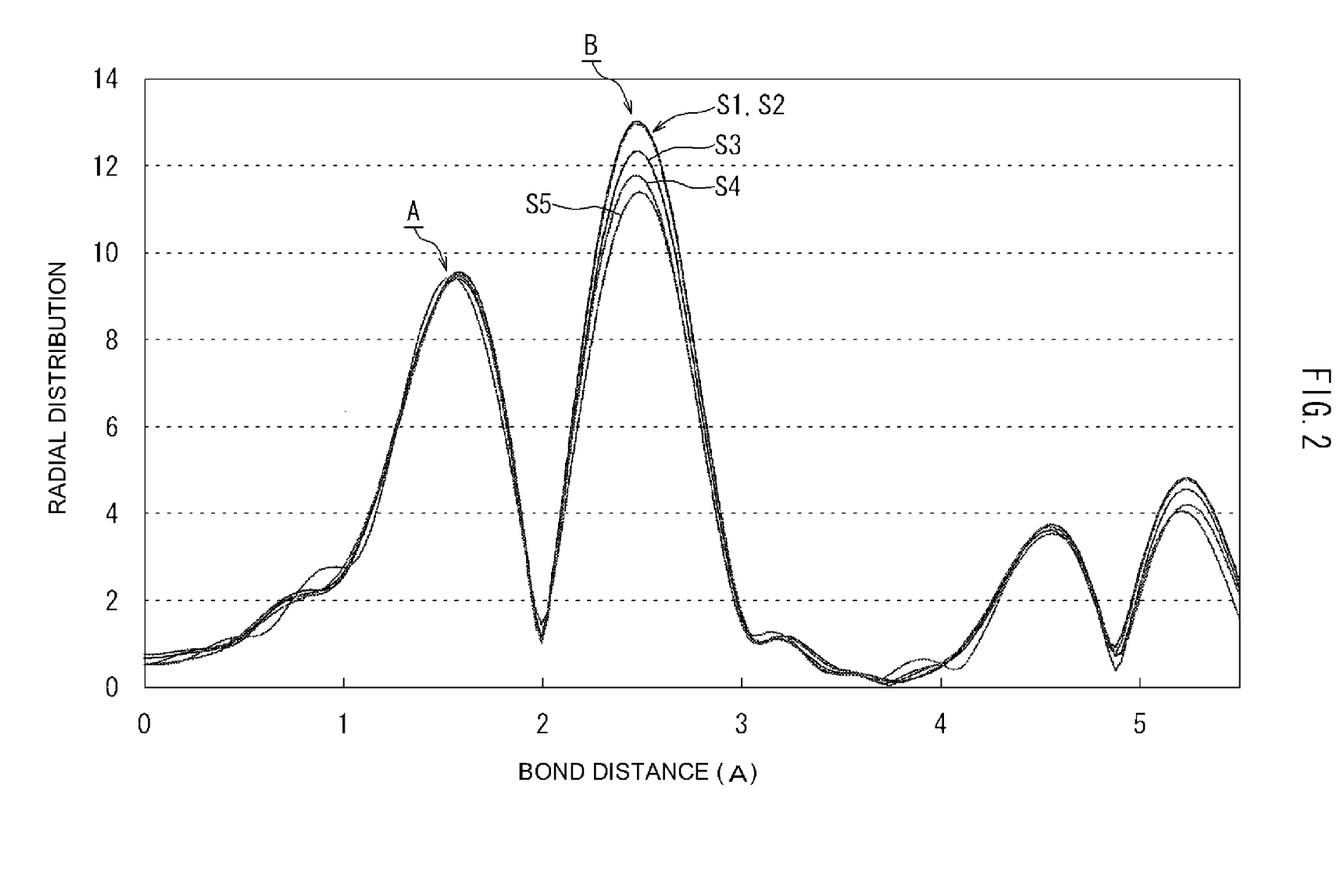
FIG. 2 shows the radial distribution function that is obtained by means of EXAFS.

Herein, EXAFS refers to Extended X-ray Absorption Fine Structure. The coordination number and the radial distribution in the crystalline structure of the lithium transition metal oxide can be examined through the EXAFS. FIG. 1 is a drawing that schematically shows the EXAFS for the manganese-containing lithium transition metal oxide. FIG. 2 shows the radial distribution function that is obtained by means of EXAFS.

As shown in FIG. 1, in measurement of the K absorption edge of a manganese atom 10 by means of EXAFS, high energy X-ray 1 is directed towards the manganese atom 10. When the manganese atom 10 in the lithium transition metal oxide is irradiated with high energy X-ray 1, the is electrons are dislodged.

In this case, a radial scattered wave w1 is generated having at its center the manganese atom 10 that has absorbed the X-ray 1. Next, the electrons dislodged from the manganese atom 10 that has absorbed X-ray 1 arrive at oxygen atom 20 neighboring manganese atom 10, and electrons are dislodged from oxygen atom 20. In this case, radial scattered wave w2 is produced with the oxygen atom 20 at its center.

Scattered wave w1 generated with manganese atom 10 that has absorbed X-ray 1 at its center and scattered wave w2 generated with oxygen atom 20 at its center mutually interfere. In this case, a stationary wave results that is dependent upon the distance between manganese atom 10 that has absorbed X-ray 1 and oxygen atom 20 that lies adjacent to the manganese atom 10. Upon Fourier transformation of this stationary wave, a radial distribution function is obtained with a peak dependent upon the distance between manganese atom 10 and its neighboring oxygen atom 20 as shown in FIG. 2.

Moreover, as shown in FIG. 1, when the electrons dislodged from manganese atom 10 that has absorbed X-ray 1 arrive at transition metal atom 30 present at the transition metal site outside of oxygen atom 20, electrons are dislodged from transition metal atom 30. In this case, radial scattered wave w3 is produced with the transition metal atom 30 at its center.

Also, scattered wave w1 generated with manganese atom 10 that has absorbed X-ray 1 at its center and scattered wave w3 generated with transition metal atom 30 at its center mutually interfere. Due to this interference, a stationary wave results that is dependent upon the distance between manganese atom 10 that has absorbed X-ray 1 and transition metal atom 30. Upon Fourier transformation of this stationary wave, a radial distribution function is obtained with a peak dependent upon the distance between manganese atom 10 that has absorbed X-ray 1 and transition metal atom 30.

In other words, for a manganese-containing lithium transition metal oxide, the radial distribution function obtained from EXAFS at the K absorption edge of manganese atom 10 possesses a first-neighbor Mn—O peak of intensity A and a second neighbor Mn-M peak of intensity B.

Incidentally, when transition metal atom 30, which is present in a transition metal site outside of oxygen atom 20, is replaced with a lithium atom, the scattered wave w3 that arises from the transition metal site is attenuated. In fact, due to its small size in comparison with a transition metal atom, the lithium atom tends to transmit the electrons dislodged from manganese atom 10. As a result, when the lithium penetration rate into transition metal sites in a lithium transition metal oxide is high, the second-neighbor Mn-M peak intensity B decreases.

For example, as shown in FIG. 2, the second-neighbor Mn-M peak intensity B has decreased more in radial distribution function S3 than in radial distribution function S1. In this case, it appears that the lithium penetration rate into the transition metal sites in the lithium transition metal oxide is higher in the sample from which radial distribution function S3 was obtained than the sample from which radial distribution function Si was obtained. In contrast, first-neighbor Mn—O peak intensity A is unchanged.

Furthermore, among the radial distribution functions S1 to S5 shown in FIG. 2, radial distribution function S1 is the radial distribution function of a positive electrode active material wherein lithium was mixed such that the amount of lithium was 95% in relation to the stoichiometric ratio of the lithium transition metal oxide. Radial distribution function S2 is the radial distribution function of a positive electrode active material wherein lithium was mixed such that the amount of lithium was 100% in relation thereto. Radial distribution function S3 is the radial distribution function of a positive electrode active material wherein lithium was mixed such that the amount of lithium was 105% in relation thereto. Radial distribution function S4 is the radial distribution function of a positive electrode active material wherein lithium was mixed such that the amount of lithium was 110% in relation thereto. Radial distribution function S5 is the radial distribution function of a positive electrode active material wherein lithium was mixed such that the amount of lithium was 115% in relation thereto.

In the examples shown in FIG. 2, almost no difference arose between radial distribution function S1 and radial distribution function S2, and they largely overlap. Also, almost no change was seen in the first-neighbor Mn—O peak intensity A even if the amount of lithium mixed in the starting materials was changed. In contrast, the second-neighbor Mn-M peak intensity B tends to decrease as the amount of excess lithium contained therein increased, (radial distribution functions S3 to S5). From the radial distribution function data that is shown in FIG. 2, a trend can be seen in which lithium penetrates transition metal sites in the lithium transition metal oxide when lithium is added in excess relative to the amount of lithium in the stoichiometric ratio of the lithium transition metal oxide.

As noted above, the second-neighbor Mn-M peak intensity B decreases when lithium penetrates the transition metal sites in the lithium transition metal oxide. In these positive electrode active material samples, the second-neighbor Mn-M peak intensity B tends to decrease as the amount of excess lithium contained therein increases (radial distribution functions S3 to S5). It appears that this is a result of penetration of the lithium added in excess into the transition metal sites in the lithium transition metal oxide.

Thus, the lithium penetration rate into the transition metal sites in the lithium transition metal oxide that comprises the main ingredient of a positive electrode active material can be evaluated based on the intensity ratio P between the first-neighbor Mn—O peak intensity A and the second-neighbor Mn-M peak intensity B. The second-neighbor Mn-M peak intensity B divided by the first-neighbor Mn—O peak intensity A, or alternatively, the reciprocal thereof, can be used as the value for the peak intensity P.

When the lithium penetration rate into the transition metal sites in a lithium transition metal oxide is large, the second-neighbor Mn-M peak intensity B decreases. As a result, when the second-neighbor Mn-M peak intensity B divided by the first-neighbor Mn—O peak intensity A is used as the value for the peak intensity P, the peak intensity P decreases when the lithium penetration rate into the transition metal sites in the lithium transition metal oxide is large. Thus, the intensity ratio P can be used to adequately evaluate the lithium penetration rate into the transition metal sites in a lithium transition metal oxide.

<<Excess Amount of Added Lithium Q>>

Moreover, the second indicator proposed by the inventors is the excess amount of added lithium Q that is present in excess of the stoichiometric ratio of the lithium transition metal oxide. Here, the excess amount of added lithium Q is defined as the amount of lithium contained in excess in the starting materials when producing the positive electrode active material that is greater than the amount necessary for generating the lithium transition metal oxide calculated from the stoichiometric ratio of the lithium transition metal oxide. The ratio of excess lithium present in the positive electrode active material can be evaluated by using this excess amount of added lithium Q in combination with the abovementioned intensity ratio P.

For example, the composition of the manganese-containing lithium transition metal oxide is denoted, for example, by $Li_x[Mn_{y1}My_2]O_z$. In this case, the stoichiometric ratio that holds between lithium, manganese, other transition metals, and oxygen is denoted by mole ratio as x:y1:y2:z. Moreover, when lithium is contained in excess of the stoichiometric ratio of the lithium transition metal oxide, the mole ratio of lithium, manganese, other transition metals, and oxygen becomes $x+\alpha$:y1:y2:z. In this case, the excess amount of added lithium Q can be written, for example, as $Q=\alpha/x$.

Here, the excess amount of added lithium Q indicates the amount of excess lithium present in the positive electrode active material relative to the stoichiometric ratio. However, part of the excess lithium added to the starting compounds when the positive electrode active material is manufactured penetrates the transition metal sites in the lithium transition metal oxide. As a result, the excess amount of added lithium Q does not always correspond to the amount of lithium present in excess in the positive electrode active material that would enable a substantial improvement in the performance of lithium-ion secondary batteries.

In contrast, the abovementioned intensity ratio P can be used to evaluate the lithium penetration rate into the transition metal sites in a lithium transition metal oxide. As a result, the ratio of excess lithium present in the positive electrode active material can be evaluated based on the intensity ratio P and the excess amount of added lithium Q.

EXAMPLES

Figure 3:
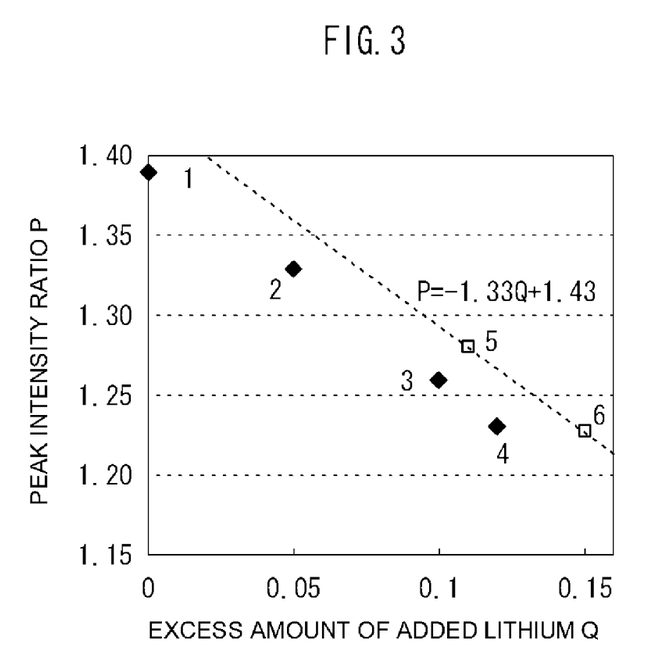
FIG. 3 shows the relationship between the excess amount of added lithium Q and the intensity ratio P.

The inventors produced a plurality of types of positive electrode active materials composed primarily of a lithium transition metal oxide (in this example, lithium nickel cobalt manganese oxide: $Li_x[Ni_{y1}Co_{y2}Mn_{y3}]O_z$) wherein the amount of lithium contained in the starting materials was varied. Then, the excess amount of added lithium Q and the intensity ratio P obtained from the radial distribution function from EXAFS at the K absorption edge in manganese were obtained for each of the plurality of types of positive electrode active materials as shown in FIG. 3. Also, batteries for evaluation purposes were produced using each of the positive electrode active materials, and the performance of each battery was measured in prescribed tests. Then, the obtained performance from the battery evaluation, the intensity ratio P, and the excess amount of added lithium Q were compared.

<<Measurement of the Radial Distribution Function>>

The radial distribution functions were obtained by means of X-ray absorption spectroscopy. Examples of measurement equipment include an 8 GeV synchrotron radiation facility. One example of an 8 GeV synchrotron radiation facility is SPring-8 (beamline BL16B2). In this case, powdered positive electrode active material can be diluted with microcrystalline cellulose powder, and samples molded into pellets can be used. Moreover, XAFS measurements can be performed in so-called transmission mode. An Si(111) crystal beam splitter can also be used.

With the abovementioned conditions, the K absorption edge of manganese (around 6550 eV) in the positive electrode active material was measured. While scanning the X-ray energy from the absorption edge to energies approximately 1000 eV higher, the incident X-ray intensity ($I_0$) and X-ray intensity after transmission through the sample (I) were measured, and the absorbance ($\ln(I/I_0)$) at each X-ray energy level was obtained. Next, a baseline was drawn in the spectrum, and the vibrational part of the EXAFS was extracted. Then, the radial distribution function around manganese was obtained by Fourier transformation of the vibrational part.

The intensity ratio P for each positive electrode active material sample can be determined from the radial distribution function. In this example, the value used for the intensity ratio P was the second-neighbor Mn-M peak intensity B divided by the first-neighbor Mn—O peak intensity A. Also, the excess amount of added lithium Q can be calculated based on the amount of lithium contained in the starting materials when the positive electrode active material is manufactured. In this example, lithium nickel cobalt manganese oxide: $Li_x[Ni_{y1}Co_{y2}Mn_{y3}]O_z$ was used as the lithium transition metal oxide. In this case, the stoichiometric ratio that holds between lithium, nickel, cobalt, manganese, and oxygen is denoted by the mole ratio x:y1:y2:y3:z. When lithium is contained in excess of the stoichiometric ratio of the lithium transition metal oxide, the mole ratio of lithium, nickel, cobalt, manganese, and oxygen becomes x+α:y1:y2:y3:z. In this example, the excess amount of added lithium Q can be written as Q=α/x.

Moreover, batteries for evaluation purposes were produced using each positive electrode active material, and the performance of the batteries was measured.

<<Battery Evaluation>>

In this example, lithium nickel cobalt manganese oxide and acetylene black as the conductive additive were mixed in polyvinylidene diflouride (PVDF) and N-methyl pyrrolidone (NMP), and a paste composition was formed for the batteries for evaluation purposes. The approximate mass ratios of each of the materials contained in the composition were 87 mass % lithium nickel cobalt manganese oxide as the positive electrode active material, 10 mass % acetylene black, and 3 mass % PVDF (NMP was excluded). This composition was applied to both sides of an aluminum foil positive electrode current collector, and a sheet shaped positive electrode (positive electrode sheet) with positive electrode active material containing layers prepared on both sides of the positive electrode current collector was formed.

Next, a separator comprising a porous resin film was interposed between the abovementioned positive electrode and a negative electrode comprising a negative electrode current collector (copper foil) coated with graphite to form an electrode assembly. A lithium-ion secondary battery was prepared using the obtained electrode assembly and a nonaqueous electrolytic solution. A mixed solvent in which ethylene carbonate (EC), ethyl methyl carbonate (EMC) and dimethyl carbonate (DMC) were mixed in a ratio of 3:4:3 by volume and which contained approximately 1 mole of lithium hexafluorophosphate ($LiPF_6$) per liter as the supporting electrolyte was used as the nonaqueous electrolytic solution.

In this example, the impedance of the batteries for evaluation purposes was measured in an environment with a temperature of −30° C. Specifically, a 0.01 Hz alternating voltage was applied between the positive electrode terminal and the negative electrode terminal in an environment with a temperature of −30° C., and the complex impedance was measured.

The results are shown in Table 1.

TABLE 1

| Sample | Excess amount of added lithium Q | Intensity Ratio P | −30° C. Impedance (0.01 Hz)/Ω |
|---|---|---|---|
| 1 | 0.00 | 1.39 | 27.5 |
| 2 | 0.05 | 1.33 | 17.6 |
| 3 | 0.10 | 1.26 | 14.3 |
| 4 | 0.12 | 1.23 | 13.9 |
| 5 | 0.11 | 1.28 | 11.7 |
| 6 | 0.15 | 1.23 | 10.9 |

The test results for the six samples 1 to 6 are listed in Table 1.

Sample 1 was a positive electrode active material with an excess amount of added lithium Q of 0.00, an intensity ratio P of 1.39, and a −30° C. impedance (0.01 Hz) of 27.5 Ω.

Sample 2 was a positive electrode active material with an excess amount of added lithium Q of 0.05, an intensity ratio P of 1.33, and a −30° C. impedance (0.01 Hz) of 17.6 Ω.

Sample 3 was a positive electrode active material with an excess amount of added lithium Q of 0.10, an intensity ratio P of 1.26, and a −30° C. impedance (0.01 Hz) of 14.3 Ω.

Sample 4 was a positive electrode active material with an excess amount of added lithium Q of 0.12, an intensity ratio P of 1.23, and a −30° C. impedance (0.01 Hz) of 13.9 Ω.

Sample 5 was a positive electrode active material with an excess amount of added lithium Q of 0.11, an intensity ratio P of 1.28, and a −30° C. impedance (0.01 Hz) of 11.7 Ω.

Sample 6 was a positive electrode active material with an excess amount of added lithium Q of 0.15, an intensity ratio P of 1.23, and a −30° C. impedance (0.01 Hz) of 10.9 Ω.

The relationship between the excess amount of added lithium Q and the intensity ratio P for each of samples 1 to 6 is shown in FIG. 3.

As shown in Table 1, samples 2 to 6 wherein excess lithium was contained in the starting materials when the positive electrode active material was manufactured showed an improvement in −30° C. impedance (0.01 Hz)/Ω over sample 1 for which excess lithium was not included. In particular, the −30° C. impedance (0.01 Hz)/Ω for samples 3 to 6 was lower than 15.0, and favorable properties were obtained. Also, the −30° C. impedance (0.01 Hz)/Ω for samples 5 and 6 was lower than 12.0, and extremely favorable properties were obtained.

One cause of this kind of decrease in the output of lithium-ion secondary batteries in low-temperature environments in comparison with normal temperature environments, for example, is that the transition metal oxide crystals in the positive electrode active material shrink, and the diffusibility of lithium ions becomes poorer as a result. In this example, the output of lithium-ion secondary batteries in a low-temperature environment improved for samples 2 to 6 that contained excess lithium in the starting materials when the positive electrode active material was manufactured. It appears that the inclusion of excess lithium contributes substantially to the improvement in battery performance.

Moreover, there was a difference in the intensity ratio P and the excess amount of added lithium Q for each sample, and a difference also occurred in the −30° C. impedance (0.01 Hz)/Ω.

As mentioned above, the intensity ratio P can be used to evaluate the lithium penetration rate into the transition metal sites in the lithium transition metal oxide. For example, as shown in Table 1, samples 4 and 6 show the same value for the intensity ratio P, and thus it is understood that samples 4 and 6 have the same lithium penetration rate into the transition metal sites in the lithium transition metal oxide. In sample 6, the excess amount of added lithium Q is greater than in sample 4, and thus it appears that the ratio of excess lithium present in the positive electrode active material is greater. As a result, it appears that a more favorable value was obtained for the −30° C. impedance (0.01 Hz)/Ω in sample 6.

Moreover, in samples 3 to 5, the excess amount of added lithium Q was largely similar, but the respective intensity ratio P of each was different, and there were variations in the −30° C. impedance (0.01 Hz)/Ω. Furthermore, among these three samples, the most favorable value for the −30° C. impedance (0.01 Hz)/Ω was obtained in sample 5. In a comparison of the intensity ratio P among these three samples, the intensity ratio P of sample 5 was the highest, and thus it can be understood that the lithium penetration rate into the transition metal sites in the transition metal oxide was the lowest in sample 5. In this way, the ratio of excess lithium present in the positive electrode active material can be evaluated based on the intensity ratio P and the excess amount of added lithium Q, and it is possible to predict the characteristics of batteries when excess lithium is included.

From the results of a variety of investigations, it was discovered that lithium-ion secondary batteries with good performance are obtained when lithium is present in excess of the stoichiometric ratio of the lithium transition metal oxide in a positive electrode active material if the following conditions (A) and (B) are satisfied.

Condition (A): $P=B/A$ and $P \geq 1.2$, where P is the intensity ratio between the first-neighbor Mn—O peak intensity A and the second-neighbor Mn-M peak intensity B in the radial distribution function obtained from EXAFS at the K absorption edge in Mn.

Condition (B): $Q \geq 0.05$, where Q is the amount of lithium that is present in excess of the stoichiometric ratio of the abovementioned lithium transition metal oxide.

Furthermore, it was discovered that lithium-ion secondary batteries with particularly good performance are obtained if the following condition (C) is satisfied.

Condition (C): $P=B/A$ and $P \geq -1.33Q+1.43$, where P is the intensity ratio between the first-neighbor Mn—O peak intensity A and the second-neighbor Mn-M peak intensity B in the radial distribution function obtained from EXAFS at the K absorption edge in Mn, and Q is the amount of lithium that is present in excess of the stoichiometric ratio of the lithium transition metal oxide.

Lithium-ion secondary batteries with further improvements in rate characteristics and cycling characteristics and with stable quality are desired for outfitting vehicles such as hybrid automobiles and electric automobiles. In particular, improving the decreased output of lithium-ion secondary batteries in low temperature environments such as those below freezing is regarded as one technical problem in outfitting vehicles such as hybrid automobiles and electric automobiles.

By evaluating the positive electrode active material using the abovementioned intensity ratio P and the excess amount of added lithium Q that are obtained from analyzing the positive electrode active material, positive electrode active materials with good performance can be selected for use in lithium-ion secondary batteries. By selectively using positive electrode active materials with good performance chosen in this manner for the manufacture of lithium-ion secondary batteries, lithium-ion secondary batteries with good performance can be stably supplied.

The method for evaluating the positive electrode active material involving one example of the present invention has been described above, but the method for evaluating a positive electrode active material relating to the present invention is not limited thereto.

For example, a variety of methods can be used for the method for obtaining the radial distribution function and the measurement method, etc. Also, the way of using the intensity ratio P and the excess amount of added lithium Q are not limited to the abovementioned example.

The invention claimed is:

1. A method for evaluating a positive electrode active material comprising primarily a manganese-containing lithium transition metal oxide that contains lithium in excess of the stoichiometric ratio of the lithium transition metal oxide, the method comprising the steps of:

obtaining an intensity ratio P between a first-neighbor Mn—O peak intensity A and a second-neighbor Mn-M peak intensity B from a radial distribution function obtained from EXAFS at the K absorption edge of manganese, wherein M represents at least one transition metal element not including Li and Mn;

obtaining an excess amount of added lithium Q contained in excess of the stoichiometric ratio of the lithium transition metal oxide; and evaluating a ratio of excess lithium present in the positive electrode active material based on the intensity ratio P and the excess amount of added lithium Q.

2. A lithium-ion secondary battery having a positive electrode in which a positive electrode active material comprising primarily a manganese-containing lithium transition metal oxide is retained in a positive electrode current collector, wherein the positive electrode active material contains lithium in excess of the stoichiometric ratio of the lithium transition metal oxide, and satisfies conditions (A) and (B) below:

Condition (A): P=B/A and P≥1.2, where P is an intensity ratio between a first-neighbor Mn—O peak intensity A and a second-neighbor Mn-M peak intensity B in a radial distribution function obtained from EXAFS at the K absorption edge in Mn, wherein M represents at least one transition metal element not including Li and Mn;

Condition (B): Q≥0.05, where Q is an excess amount of added lithium that is contained in excess of the stoichiometric ratio of the lithium transition metal oxide.

3. A lithium-ion secondary battery having a positive electrode in which a positive electrode active material comprising primarily a manganese-containing lithium transition metal oxide is retained in the positive electrode current collector, wherein the positive electrode active material contains lithium in excess of the stoichiometric ratio of the lithium transition metal oxide, and satisfies condition (C) below:

Condition (C): P=B/A and P≥−1.33Q+1.43, where P is an intensity ratio between a first-neighbor Mn—O peak intensity A and a second-neighbor Mn-M peak intensity B in a radial distribution function obtained from EXAFS at the K absorption edge in Mn, wherein M represents at least one transition metal element not including Li and Mn, and Q is an excess amount of added lithium that is contained in excess of the stoichiometric ratio of the lithium transition metal oxide.

4. A positive electrode active material for a lithium-ion secondary battery comprising primarily a manganese-containing lithium transition metal oxide, wherein the positive electrode active material contains lithium in excess of the stoichiometric ratio of the lithium transition metal oxide, and satisfies conditions (A) and (B) below:

Condition (A): P=B/A and P≥1.2, where P is an intensity ratio between a first neighbor Mn—O peak intensity A and a second-neighbor Mn-M peak intensity B in a radial distribution function obtained from EXAFS at the K absorption edge in Mn, wherein M represents at least one transition metal element not including Li and Mn;

Condition (B): Q≥0.05, where Q is an excess amount of added lithium that is contained in excess of the stoichiometric ratio of the lithium transition metal oxide.

5. A positive electrode active material for a lithium-ion secondary battery comprising primarily a manganese-containing lithium transition metal oxide, wherein the positive electrode active material contains lithium in excess of the stoichiometric ratio of the lithium transition metal oxide, and satisfies condition (C) below:

Condition (C): P=B/A and P≥−1.33Q+1.43, where P is an intensity ratio between a first-neighbor Mn—O peak intensity A and a second-neighbor Mn-M peak intensity B in a radial distribution function obtained from EXAFS at the K absorption edge in Mn, wherein wherein M represents at least one transition metal element not including Li and Mn, and Q is an excess amount of added lithium that is contained in excess of the stoichiometric ratio of the lithium transition metal oxide.

* * * * *